United States Patent
Raines et al.

[11] Patent Number: 5,948,490
[45] Date of Patent: Sep. 7, 1999

[54] PRINTED COOK-IN SHRINK FILM

[75] Inventors: Charles D. Raines; Gary L. Connaughty, both of Columbus, Ga.; R. Tuck Aaker, Sarasota, Fla.

[73] Assignee: Plicon, Inc., Salt Lake City, Utah

[21] Appl. No.: 08/720,820

[22] Filed: Oct. 2, 1996

Related U.S. Application Data

[63] Continuation-in-part of application No. 08/495,833, Jun. 28, 1995, abandoned, which is a continuation of application No. 08/154,251, Nov. 18, 1993, abandoned.

[51] Int. Cl.⁶ .................................................. B29D 22/00
[52] U.S. Cl. .................... 428/35.2; 428/497; 428/459.5; 428/35.7; 428/195; 428/475.5; 428/475.8; 428/475.2; 428/476.9; 428/483; 428/516; 426/87; 426/113; 426/114; 426/127; 426/129; 426/383; 426/407; 426/410; 426/412; 206/459.5; 206/497
[58] Field of Search .................... 426/87, 113, 114, 426/127, 383, 401, 407, 410, 412, 129, 126; 206/497, 459.5; 428/34.9, 35.2, 35.7, 35.4, 35.9, 36.6, 36.7, 195, 347, 474.9, 475.5, 475.8, 515, 476.3, 349, 516, 476.9, 483, 475.2; 383/210, 211; 53/415, 442; 264/291, 299, 319

[56] References Cited

U.S. PATENT DOCUMENTS

| | | | |
|---|---|---|---|
| 2,121,041 | 6/1938 | Morgan | 426/87 X |
| 3,696,580 | 10/1972 | Satzer, Sr. | 53/27 |
| 3,900,635 | 8/1975 | Funderburk et al. | 426/129 X |
| 4,133,924 | 1/1979 | Seino et al. | 426/412 X |
| 4,136,205 | 1/1979 | Quattlebaum | 426/412 |
| 4,333,570 | 6/1982 | Heider | 206/432 |
| 4,469,742 | 9/1984 | Oberle et al. | 426/412 X |
| 4,525,414 | 6/1985 | Ohya et al. | 428/476.3 X |
| 4,577,205 | 3/1986 | Shibata et al. | 346/204 |
| 4,606,922 | 8/1986 | Schirmer | 426/129 X |
| 4,626,455 | 12/1986 | Karabedian | 428/35 |
| 4,652,490 | 3/1987 | Arita et al. | 426/127 X |
| 4,758,463 | 7/1988 | Vicik et al. | 428/349 X |
| 4,801,486 | 1/1989 | Quacquarella et al. | 428/35.4 X |
| 4,837,088 | 6/1989 | Freedman | 156/243 |
| 4,855,183 | 8/1989 | Oberle | 426/129 X |
| 4,857,399 | 8/1989 | Vicik | 428/515 X |
| 4,879,124 | 11/1989 | Oberle | 426/127 X |
| 4,883,693 | 11/1989 | Ohya et al. | 428/475.8 X |
| 4,888,223 | 12/1989 | Sugimoto et al. | 428/475.8 X |
| 4,892,765 | 1/1990 | Hisazumi et al. | 428/34.9 X |
| 4,911,979 | 3/1990 | Nishimoto et al. | 428/476.3 X |
| 4,948,604 | 8/1990 | Kuehne et al. | 426/127 X |
| 4,958,735 | 9/1990 | Odabashian | 206/497 |
| 4,971,845 | 11/1990 | Aaker et al. | 428/349 X |
| 4,985,300 | 1/1991 | Huang | 428/332 |
| 4,997,690 | 3/1991 | Lustig et al. | 428/35.4 |
| 5,047,253 | 9/1991 | Juhl et al. | 426/127 X |
| 5,051,266 | 9/1991 | Juhl et al. | 426/129 |
| 5,079,051 | 1/1992 | Garland et al. | 428/35.4 X |
| 5,089,319 | 2/1992 | Bothe | 428/349 X |
| 5,139,804 | 8/1992 | Hoffman | 426/129 X |
| 5,139,805 | 8/1992 | Tada et al. | 426/127 X |
| 5,169,714 | 12/1992 | Kondo et al. | 428/349 X |
| 5,186,988 | 2/1993 | Dixon | 428/34.9 X |
| 5,190,609 | 3/1993 | Lin et al. | 156/85 |
| 5,213,900 | 5/1993 | Friedrich | 428/34.9 X |
| 5,233,315 | 8/1993 | Katsura et al. | 428/36.92 |
| 5,234,733 | 8/1993 | Schloegl et al. | 428/36.91 |
| 5,279,872 | 1/1994 | Ralph | 426/127 X |
| 5,298,326 | 3/1994 | Norpoth et al. | 428/36.7 X |
| 5,322,728 | 6/1994 | McMurtrie et al. | 428/35.4 X |
| 5,342,662 | 8/1994 | Aoyama et al. | 428/35.4 X |
| 5,344,715 | 9/1994 | Negi et al. | 428/36.7 X |
| 5,405,629 | 4/1995 | Marnocha et al. | 426/129 X |
| 5,462,756 | 10/1995 | Raines et al. | 426/127 X |

*Primary Examiner*—Milton Cano
*Attorney, Agent, or Firm*—Hill & Simpson

[57] ABSTRACT

A cook-in package for food products is provided having a printed label layer positioned within at least one wall portion of the cook-in package. The printed cook-in package serves dual purposes and eliminates the need for a second printed shrink bag. Moreover, the printed package is capable of being formed and cooked, while still retaining it readable qualities and being resistant to abuse and some distortion.

6 Claims, 2 Drawing Sheets

PRINTED COOK-IN SHRINK FILM

This is a continuation-in-part of application Ser. No. 08/495,833, filed Jun. 28, 1995, now abandoned which is continuation of application Ser. No. 08/154,251, filed Nov. 18, 1993, now abandoned.

BACKGROUND OF THE INVENTION

The present invention relates generally to thermoplastic thermoformable packaging film suitable for cook-in packaging and their use. More particularly, the present invention provides a cook-in package including a printed label within the layers of the film structure. The printed label is capable of being formed, shrunk and cut, while still retaining its readable qualities while being resistant to abuse and some distortion.

Many food products during preprocessing are stuffed into a casing and then placed in a heated medium, such as a hot water bath, for cook-in to produce a precooked encased food product. The term "cook-in" conventionally refers to cooking of a food product while contained in a package. Alternatively, the package may be a heat-shrinkable bag that shrinks tightly about a contained food product upon initial exposure to cook-in conditions.

The term "cook-in package" refers to packaging material structurally capable of withstanding exposure to cook-in, time-temperature conditions, while containing a food product. Cook-in, time-temperature conditions typically imply a long slow cook. For example, the product may be steam cooked at 150° to 190° F. for 5–7 hours. Under such conditions, a packaging material properly characterized as cook-in will maintain heat seal integrity and will be delamination resistant.

A wide variety of heat-shrinkable, multi-layer plastic films are useful as packaging materials for processed meat or like food. Among the variety of packaging containers, one class of container structures involves the use of a formable web member that is preformed into a desired tray configuration, pocket, or the like before being filled with food product and sealed with a (usually non-formable) lid web member. The web structures employed in this class of container structures are typically in the form of multi-layered webs or laminates. Each layer individually serves one or more functions and coact together to provide a container wall structure that protects the food product from the environment in a package system. Furthermore, such packages provide thermal stability, meat adherency and heat-shrink characteristics suitable for the form, fill and cook operations.

Commercial procedures being used to package food products require at least two bags if they are to contain printed information, one being an unprinted forming film and the other being a printed shrink bag. In one class of structures, the unprinted forming package generally consists of a forming web and a non-forming web. In operation, the forming web is heated and formed into a pocket on the packaging machine. The food product, such as turkey, is placed into the pocket, the web is advanced and the non-forming web is sealed onto the flanges of the formed web. The packaged turkey is then put through a hot water shrink machine to tighten the package around the product. The packaged food product is then steam cooked at about 170–190° F. for 5–7 hours.

After the cooking process is completed, the finished cooked product, in the unprinted forming package, goes through another operation for "retailing." In particular, the package containing the finished cooked food product is placed into a printed shrink bag, the top sealed and put through a hot water shrink bath or tunnel for shrinking the bag around the packaged food product. This current practice of "over-bagging" is a complete second operation for the finished product and very costly.

In an effort to eliminate the additional costs of over-bagging, attempts have been made to produce some type of printed structure. However, prior attempts to provide printed forming films have proven unsatisfactory. Printed forming films have been produced with a solid color background or a continuous design, such as cross-hatch, or a word or words that provide a design on the formed film. However, in all cases in the past, the designs have become distorted because the unoriented printed substrate cannot be formed within the consistency or balance that allows a printed label to be legible. The complete labels have therefore not been able to be printed on the flexible thermoformed cook-in films.

Therefore, a need exists for a cook-in package that includes a printed label, thereby eliminating the need for dual packaging.

SUMMARY OF THE INVENTION

The present invention provides a cook-in package for food products having a printed label layer positioned within at least one wall portion of the cook-in package. The cook-in package includes first and second heat shrinkable wall portions that are heat sealable around the food product. In at least one of such wall portions, a printed film is laminated to a layer of the wall portion.

In an embodiment, at least one of the wall portions includes a co-extruded film layer laminated to a polyamide layer that in turn is laminated to an unoriented polyolefin layer.

In an embodiment, the printed label layer of at least one of the wall portions includes a cast co-polymer polypropylene film. A printed material, such as product instructions and so forth, is reverse printed onto the polypropylene film, which is then laminated to the wall portion. Alternatively, in some cases the printing may be done on the surface of the polyamide layer with the other layer laminated over it.

In an embodiment, the printed label layer of at least one of the wall portions includes a formable nylon film. As with the previous embodiment, a printed material is reverse printed onto the formable nylon film, which is then laminated to the wall portion.

An advantage of the present invention is that it eliminates the costly secondary operation of over-bagging the cook-in package with a printed shrink bag.

Another advantage of the present invention is that it eliminates the need to produce a second printed shrink bag for labels and the like.

Still further, another advantage of the present invention is that it provides a printed cook-in structure that can be formed, shrunk, and cut, while still retaining readable qualities and being resistant to abuse and distortion.

A method of the invention provides for the pre-distorting of a printed label applied onto or within a formable web such that when the formable web is processed on a pocket forming machine, the pre-distorted printing label will be stretched into its readable and orderly, non-distorted appearance. In particular, a test pattern film is formed into pockets on the machine to be used, the thus formed pocket of the test pattern material is analyzed as to its particular distortions, and the printing label and printing plates thereof, are pre-distorted to compensate for these expected distortions for that particular machine. The test pattern can be in the form of diamond grids or "cross-hatching" wherein diamond of the cross-hatching can be measured for average distortion, or diamonds at particular locations where local distortions may be present, or where distortions are not uniform are measured, and these distortions can be used locally to pre-distort the printed label accordingly.

Additional features and advantages of the present invention are described in, and will be apparent from, the detailed description of the presently preferred embodiments and the drawings.

DETAILED DESCRIPTION OF THE PRESENTLY PREFERRED EMBODIMENTS

The present invention provides a cook-in package for food products that uniquely has a printed label positioned within at least one wall portion of the cook-in package. The cook-in package of the present invention not only acts as a cook-in package but also as a printed shrink bag. Thus, the present invention eliminates the costly secondary operation of over-bagging the cook-in package with a printed shrink bag.

Figure 1:
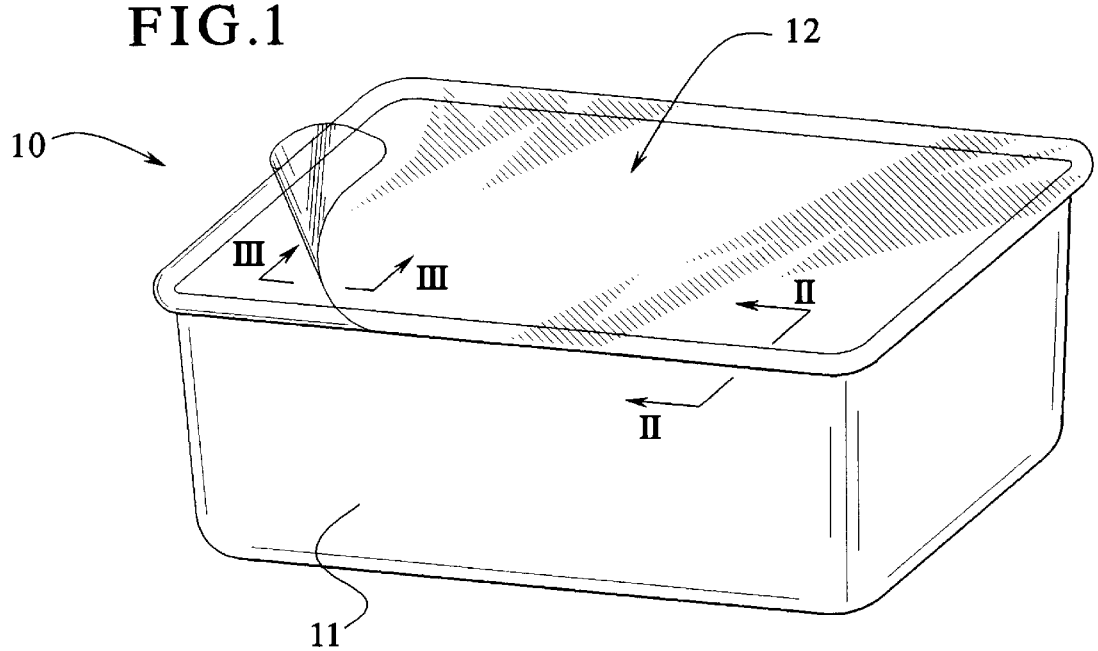
FIG. 1 is perspective view of one embodiment of a container structure of the present invention wherein the tray portion thereof is formed from a web structure of FIG. 3.

Referring now to the drawings, FIG. 1 illustrates one embodiment of the cook-in package 10 of the present invention. The cook-in package 10 includes a formable web structure 11 and a non-formable web structure 12.

As those skilled in the art will appreciate, a variety of different films may be used for constructing the formable web structure 11 and the non-formable web structure 12. For example, suitable films that may be used pursuant to the present invention include nylon, blended olefins, and multi-ply olefins. Furthermore, an adhesive, such as a polyester adhesive, may be used to bond the various films to form a layered structure. Alternatively, of course, co-extrusion of the various layers eliminates the need for an adhesive.

Still further, as those skilled in the art will again appreciate, the desired thickness of the layers depends on the particular use of the cook-in package. In an embodiment, the thicknesses range from 2 to 8 mils for each particular layer.

By way of example, and not limitation, examples of web structures that may be used pursuant to the present invention will now be given.

Figure 2:
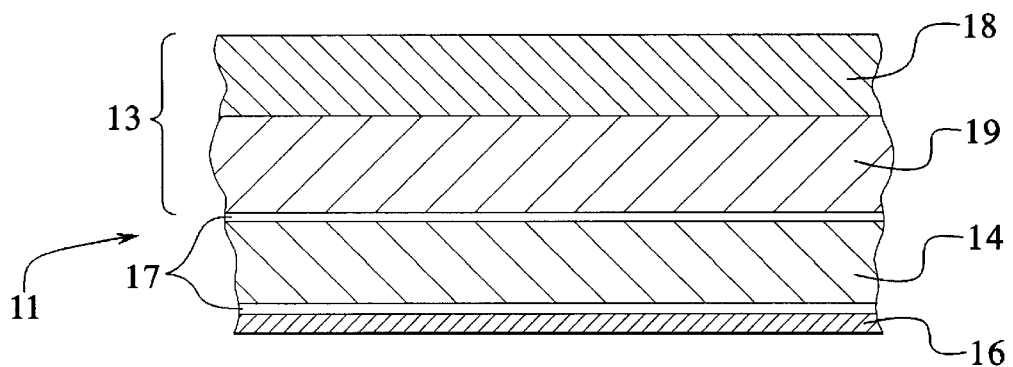
FIG. 2 illustrates a fragmentary enlarged cross-sectional view, taken generally along the line II—II of FIG. 1, of one embodiment of a formable web structure of the present invention.

FIG. 2 is a cross-sectional view of the formable web structure 11 of the present invention. The formable web structure 11 includes an inner co-extruded nulti-layered film 13, an intermediate layer 14, and an exterior layer 16. Positioned between the co-extruded layer 13 and the intermediate layer 14, as well as between the intermediate layer 14 and the exterior layer 16, is an adhesive layer 17.

The co-extruded film layer 13 is comprised of integrally formed layers 18 and 19, respectively. In an embodiment, the layer 19 is comprised of an ionomer polymer based upon a zinc salt of ethylene/methacrylic acid copolymer. Such ionomer polymers are available commercially from various manufacturers, for example, from the E.I. duPont and deNemours Company under the trademark "Surlyn/1650."

In an embodiment, the layer 18 is comprised of an ethylene acid copolymer, such as ethylene methacrylic acid copolymers. Such polymers are available from various manufacturers. For example, the polymers may be obtained from E.I. duPont under the trademark "Nucrel 0902", which is similar to "Nucrel 0903" except in having a melt index of about 1.5 rather than 2.5 dg/min.

The intermediate layer 14 is comprised of a selected polyamide that is characterized by low crystallinity and a highly amorphous structure. Layer 12 has the capacity to heat shrink at a temperature in the range of from about 155° to 185° F. in each of a transverse and a longitudinal direction. A suitable polyamide polymer for this purpose is Nylon-666 which is available from Allied Chemical Company under the trade designation "Xtraform," resin No. 1539.

The exterior layer 16 includes a printed label reverse printed onto a cast co-polymer polypropylene film. After the printed label is reverse printed onto the polypropylene film, the polypropylene film is laminated to the intermediate layer 14 of the formable web structure 11. The exterior layer 16, consisting of polypropylene, does not inhibit the forming of the structure 11. Moreover, the polypropylene conforms in the shrinkage of the finished package and is unaffected by the steam cooking. It is also possible in the invention to surface print the label onto the intermediate layer 14, then laminate the exterior layer 16 over it.

The adhesive layer 17 is comprised of an adhesive and is preferably a polyester adhesive that functions to bond the special polyamide layer 14 to the zinc ionomer layer 19. Furthermore, the adhesive layer 13 functions to bond the exterior layer 16 with the polyamide layer 14.

In practice, the polyester adhesive is applied as a solution or dispersion in combination with a liquid carrier to either of the two layers to be bonded together, after which the liquid carrier is preferably removed by evaporation to leave a layer of polyester adhesive. Thereafter, the respective layers can be brought together, with the aid of heat and pressure, to form the desired web structure 11 as shown in FIG. 2. Various polyester adhesives suitable for use in the practice of the present invention are available commercially from various manufacturers. For example, a suitable polyester adhesive is available commercially under the trade designation "56065" from National Starch Corporation.

Figure 4:
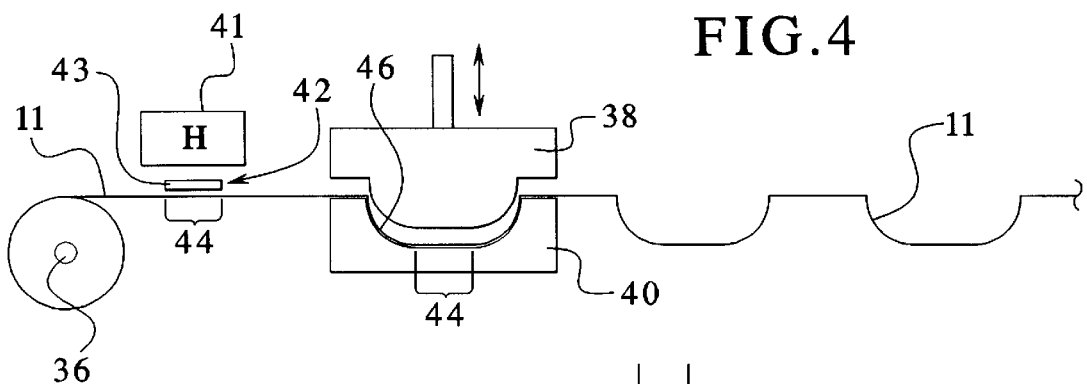
FIG. 4 is a schematic sectional view of a forming apparatus of the present invention.

An inventive method is applied to supply printed structures for the "formed" side of the package. As shown in FIG. 4, a roll 36 of formable film 11 is formed into the pocket portion shown in FIG. 1 by a punch or "plug" 38 and a correspondingly shaped die 40. Upstream of the punch 38 is an infrared preheater 41 which heats and makes soft the film 11 for forming into a pouch in the die 40 by the plug 38. Preprinted labels located within spaced apart label regions 44 within the film 11 can be kept from stretch distortion by the forming operation by use of an insert or shield 42 having a surface 43 located beneath the heater 41 which shields the label region 44 from heat which will limit stretching in this region during subsequent forming of sidewalls 46 of the pocket portion in the die 40. The regions surrounding the label region 44 will be at a greater temperature and will be more easily formable at the die 40. This results in little or no stretch in the transverse direction (out of the page in FIG. 4) and very little in the machine direction (left and right in FIG. 4) within the label region 44.

Figure 5:
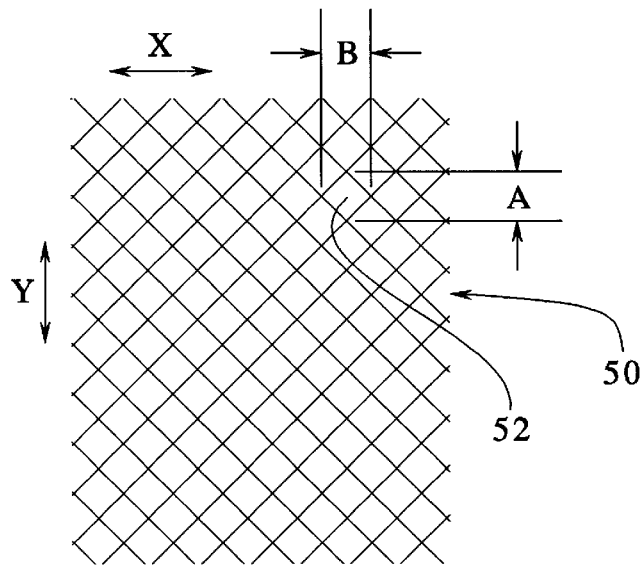
FIG. 5 is a plan view of a formable film printing test pattern of the present invention.
Figure 6:
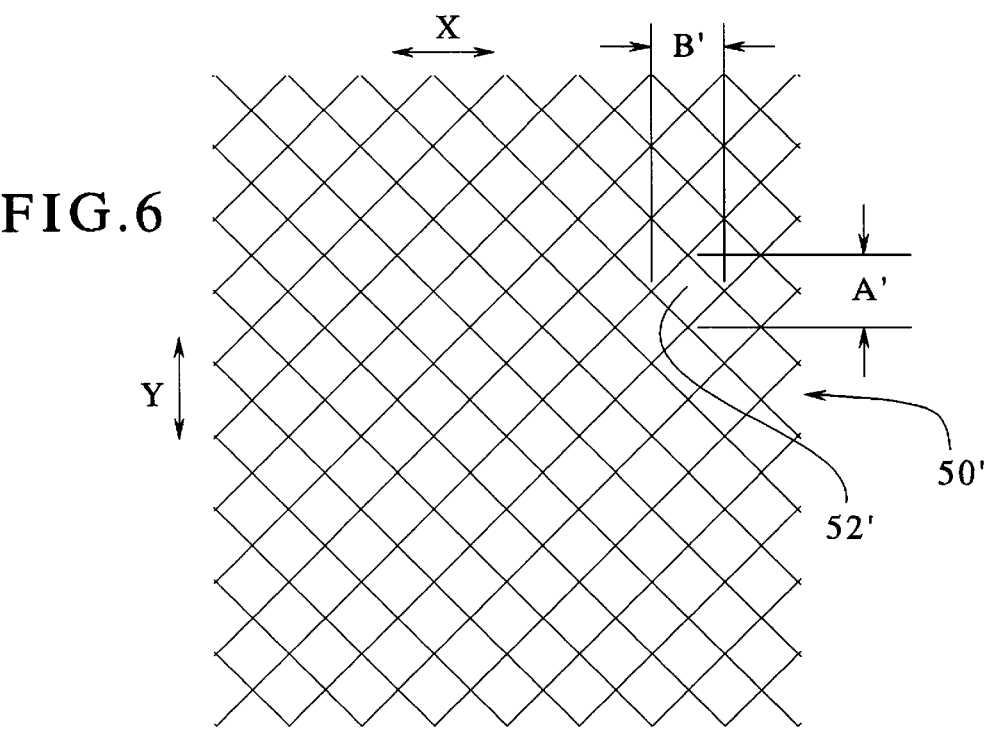
FIG. 6 is a plan view of the film printing test pattern of FIG. 5 after distortion.

A different method is used as demonstrated by FIG. 5 and 6. This method requires some unique designing of the printed copy or design in addition to the proper selection of films, inks and adhesives. In this method the preprinted label is intentionally pre-distorted to compensate for stretching distortion caused by the punch 38 and die 40 during formation of the pocket.

First the ink to be used should be a "high solid" type such as CRODA'S H/S LeBOND, which provides a very opaque color before the formable web structure is formed. This will minimize the thinning of the printed copy by forming distortion which can cause a faded or washed out appearance. The printed design must be controlled or designed such that it will be both legible and not so distorted as to make it unacceptable in appearance.

To control a design of this printed copy a test pattern film 50 of printed "cross-hatch" design, of a type that is typically used on deli-hams and printed in red, is run on the particular machine that will be used for forming the formable web structure 11. After the forming, the stretching pattern and orientation of the thus distorted cross-hatch design 50' is measured and the "minus percents" can be determined both in machine direction Y and transverse direction X. A shrunken or reverse pre-distorted design can then be developed. The plates and printed design would then be pre-shrunk and pre-printed according to this pattern so when formed on the particular machine, and thus stretched, would be more closely accurate to a readable printed label.

In this latter method the insert 42 can be eliminated or can be used also, so that the amount of stretching distortion is reduced in the label region. Also, although for simplicity the stretched pattern 50' is shown evenly stretched, a more complex stretching pattern can also be accommodated by analyzing particular diamonds or groups of diamonds and pre-distorting accordingly at each analyzed position of the printed label. Particular diamonds 52 or groups of diamonds can be analyzed as to their distortion in the machine direction dimension A and transverse direction B compared to the distorted, corresponding diamond 52' and the dimensions A', B'. Although a cross-hatched grid is shown, a rectangular grid, or any other measurement indicator can be used.

Figure 3:
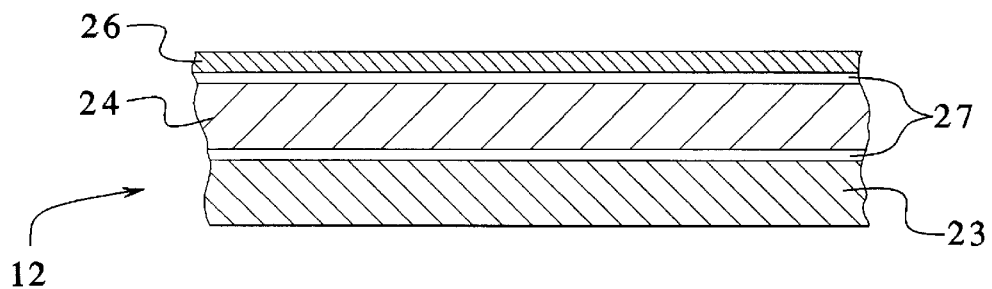
FIG. 3 is a view similar to FIG. 2 but, taken generally along the line III—III of FIG. 1, illustrates a non-formable web structure of the present invention that is suitable for use as a lid structure in the container of FIG. 1.

FIG. 3 illustrates the non-formable web structure 12 of the present invention. The non-formable web structure 12 consists of a top layer 26, a middle layer 24 and an inner layer 23. As with the formable web structure 11, the non-formable web structure 12 also includes an adhesive layer 27 positioned between both the top layer 26 and middle layer 24, as well as between the middle layer 24 and the inner layer 23.

The inner layer 23 is comprised of an ethylene acid copolymer similar to that employed in layer 18 described above. The middle layer 24 is comprised of a polyamide that is similar in polymer structure and physical properties to the polyamide comprising the above-described intermediate layer 14.

The top layer 26 includes a printed label reverse printed onto a formable nylon film. The reverse printed formable nylon film is then laminated to the middle layer 24. The nylon within the top layer 26 maintains the heat resistance needed for this non-formable structure 12 against a hot "sealing plate" and is unaffected by the steam cooking.

The adhesive layers 27 are similar in function and in composition to the adhesive layers 17 of the formable web structure 11. As with the formable web structure 11, these adhesive layers 27 may be eliminated if middle layer 24 and inner layer 23 are co-extruded.

Understandably, various changes and modifications to the presently preferred embodiments described herein will be apparent to those skilled in the art. Such changes and modifications can be made without departing from the spirit and scope of the present invention and without diminishing its intended advantages. It is, therefore, intended that such changes and modifications be covered by the appended claims.

We claim:

1. A formable web shapeable by heat forming methods to form a unitary formed pocket piece of a two-piece cook-in package including said pocket piece and a lid piece, said unitary formed pocket piece including a planar peripheral edge and a food product receiving cavity defined by a pocket end wall spaced from the peripheral edge and a continuous upstanding sidewall extending between the pocket end wall and the peripheral edge, said pocket piece including printed indicia thereon presenting a non-distorted image, said formable web comprising: a thermoplastic laminate sheet comprising an inner layer of the polyolefin polymer or copolymer, an intermediate layer of a polyamide, an exterior layer of polypropylene and printed indicia of ink disposed between the intermediate layer and the exterior layer, said printed indicia having a first distorted image, such that when the formable web is shaped by thermoforming methods to define said pocket piece, the printed indicia is transformed from said first distorted image to the non-distorted image.

2. A formable web as defined in claim 1, wherein said inner layer consists essentially of an ethylene acid copolymer.

3. A formable web as defined in claim 1, wherein the inner layer and the intermediate layer are secured together by coextrusion.

4. A formable web as defined in claim 1, wherein the exterior layer is secured to the intermediate layer by a polyester adhesive.

5. A formable web as defined in claim 1, wherein the inner layer and the intermediate layer, and the intermediate layer and the exterior layer are respectively secured together by a polyester adhesive.

6. A formable web as defined in claim 1, further comprising a coextruded ionomer polymer layer on said inner layer disposed between the inner layer and the intermediate layer.

* * * * *